US006821605B2

United States Patent
Fiorinelli et al.

(10) Patent No.: US 6,821,605 B2
(45) Date of Patent: Nov. 23, 2004

(54) THERMOFORMED PANEL AND METHOD FOR ITS PRODUCTION

(75) Inventors: Luigi Fiorinelli, Lusernetta (IT); Umberto Demichelis, Turin (IT); Franco Tasca, Virle Piemonte (IT)

(73) Assignee: San Valeriano S.p.A., Turin (IT)

( * ) Notice: Subject to any disclaimer, the term of this patent is extended or adjusted under 35 U.S.C. 154(b) by 0 days.

(21) Appl. No.: 09/865,666

(22) Filed: May 29, 2001

(65) Prior Publication Data

US 2002/0012771 A1 Jan. 31, 2002

(30) Foreign Application Priority Data

May 26, 2000 (IT) ..................................... TO2000A0483

(51) Int. Cl.⁷ ................................................ B32B 3/30
(52) U.S. Cl. ....................... 428/159; 428/156; 428/158; 428/180; 428/167; 296/198
(58) Field of Search ............................... 428/156, 158, 428/159, 180, 167; 296/198

(56) References Cited

U.S. PATENT DOCUMENTS 4,274,236 A * 6/1981 Kessler ..................... 52/309.8

5,985,191 A 11/1999 Clarke
6,308,830 B1 10/2001 Richter

FOREIGN PATENT DOCUMENTS

| EP | 0 755 762 A | 1/1997 |
| EP | 0 810 145 A | 12/1997 |
| WO | WO 98 30466 A | 7/1998 |

* cited by examiner

Primary Examiner—William P. Watkins, III
(74) Attorney, Agent, or Firm—Sughrue Mion, PLLC

(57) ABSTRACT

A panel comprising at least one layer of thermoformable plastics material having separate regions of different thickness, is obtained by a method comprising the steps of: extruding of a sheet of plastics material with the addition to the said material of an expansion agent, the extrusion being conducted in conditions such as to avoid expansion of the material or to cause only partial expansion thereof; heating the thus-obtained sheet to a temperature such as to cause post expansion of the material; and thermoforming the sheet in a thermoforming cavity of complementary shape to the desired panel so that the thermoformed panel produced has in the regions of greater thickness an expanded cellular structure where the material has a lower density than the density of the material in the regions of lesser thickness.

3 Claims, 3 Drawing Sheets

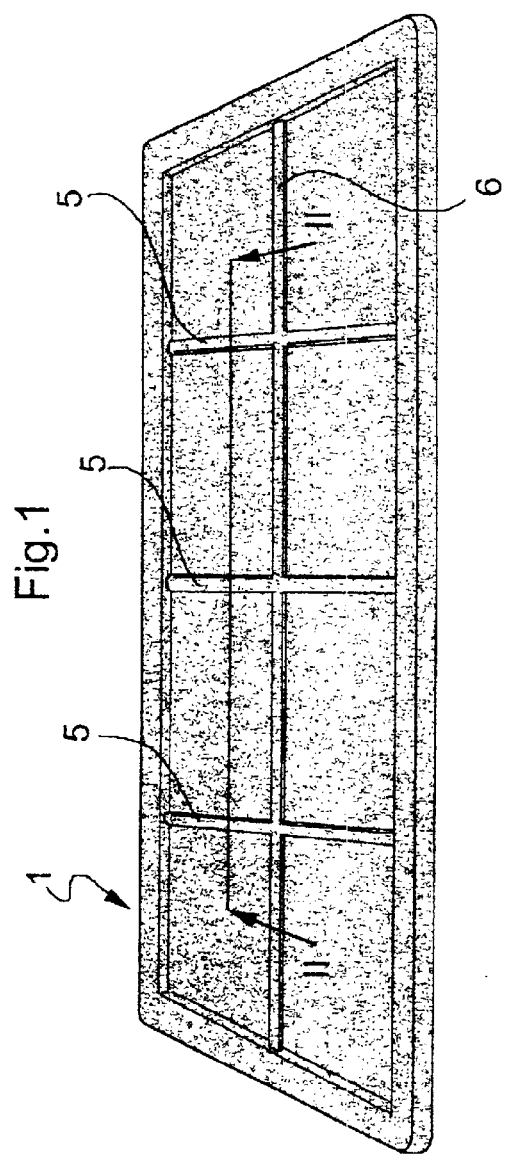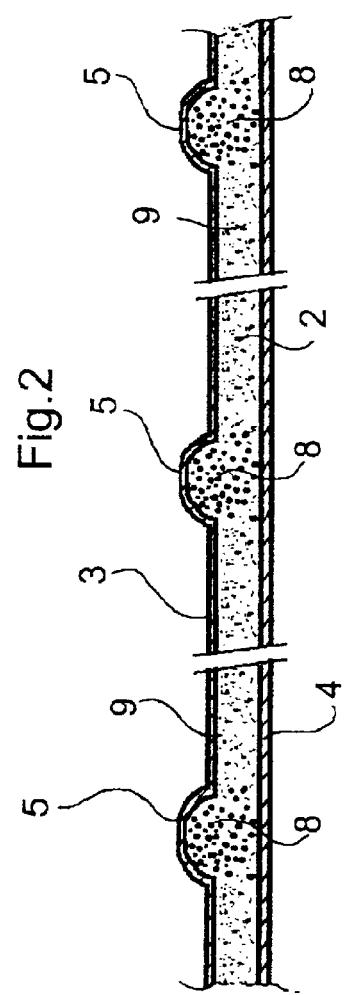

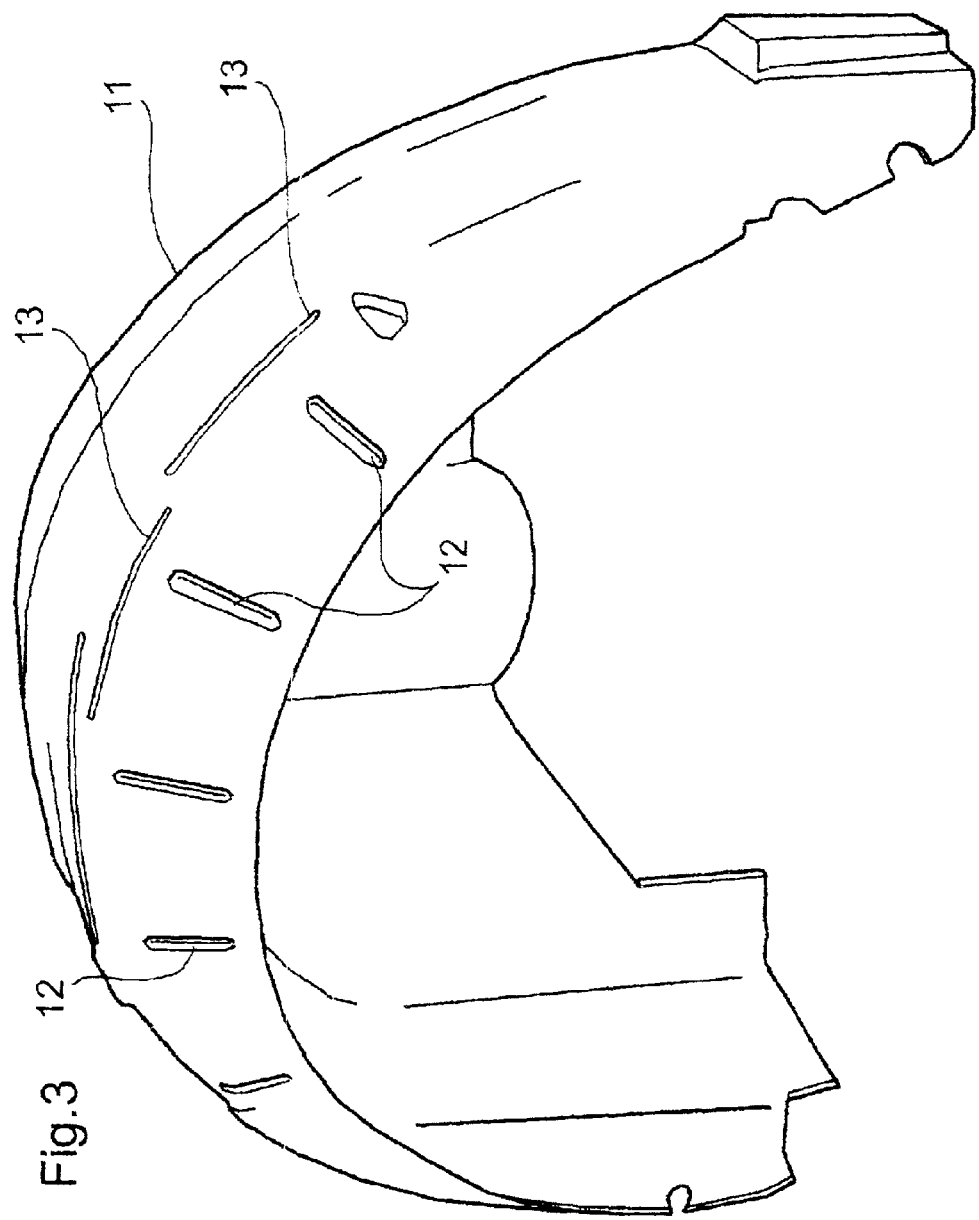

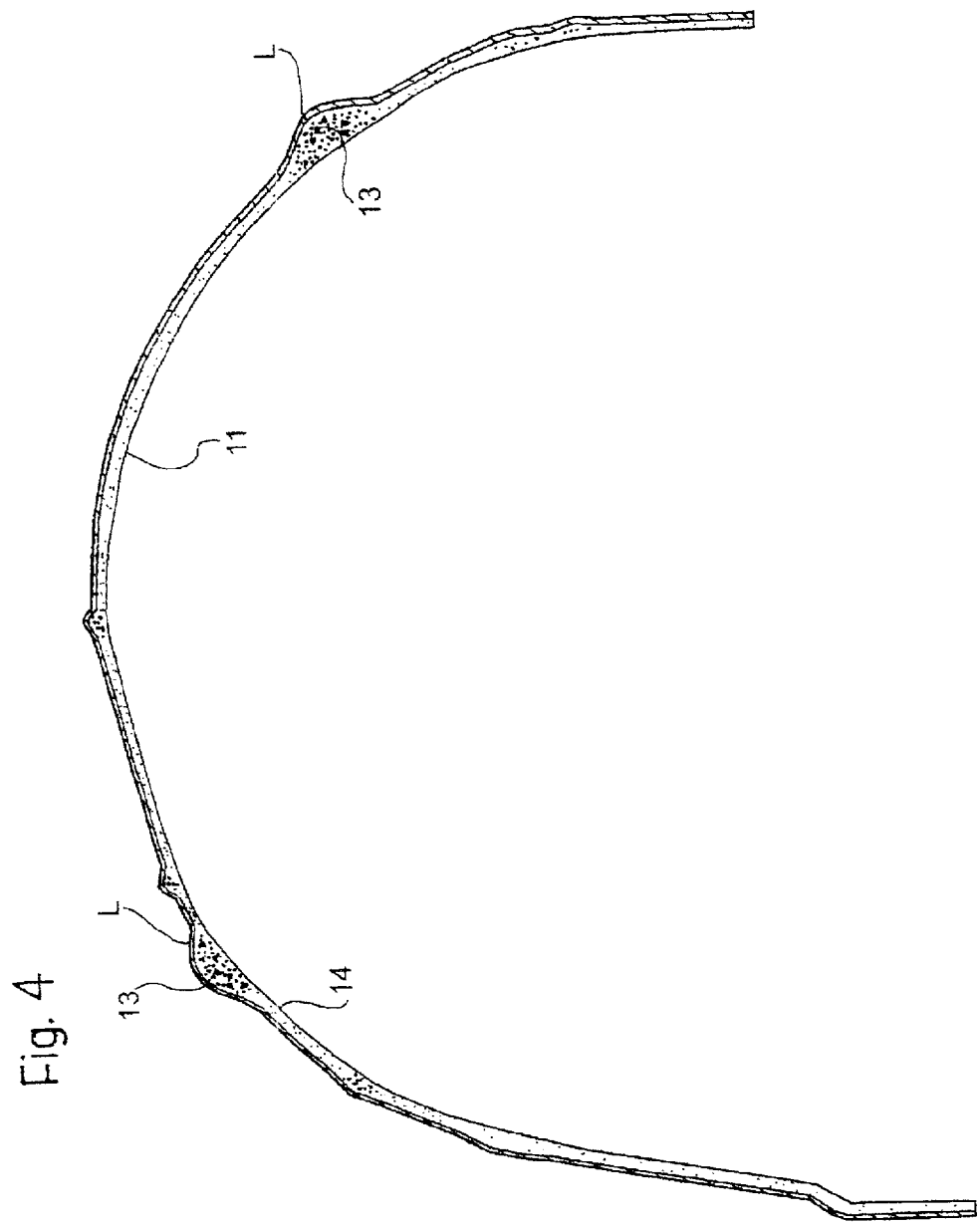

THERMOFORMED PANEL AND METHOD FOR ITS PRODUCTION

BACKGROUND OF THE INVENTION

The present invention relates to a thermoformed panel obtained from a sheet of thermoformable plastics material, and to a process for its preparation.

Of particular interest within the scope of the invention are thermoformed panels of the type conventionally utilised in the motor vehicle industry such as, for example, structural or cladding panels, wheel arch panels, head linings and the like; however, it is intended that the invention is not to be limited to specific applications.

The thermoforming procedure for thermoformable plastics material is well known in the art and is advantageous from the economic point of view for the production of shaped panels. One limitation of this process is generally that the thermoformed articles thus obtained have opposite faces shaped in such a way as to be complementary to one another. If it is desirable to produce panels which have reinforcing ribs or ridges, for example to improve the mechanical strength against flexing, or to obtain on the surface of the panel projections of an aesthetic or useful character to shape the panel according to predetermined shapes, the conventional thermoforming process implies the deformation of both faces of the panel. In general, the presence of a rib projecting from one face of the panel causes the presence, on the other face, of a corresponding concavity and this constitutes a limitation in relation to the shapes which can be obtained by thermoforming.

Particularly in the case of panels of large dimensions the formation of reinforcing ribs is often an essential requirement for the purpose of achieving an adequate structural rigidity and, as mentioned, this results in constraints in relation to the aesthetic aspect of one of the two faces of the panel.

SUMMARY OF THE INVENTION

The present invention has the object of overcoming the said limitations. To this end a first object of the invention is a process for the production of a panel comprising a sheet of thermoformable plastics material having separate regions with a greater thickness than the basic thickness of the sheet, characterised in that it comprises:

- extrusion of the plastics material sheet with the addition to the said material of an expanding agent, the extrusion being conducted in conditions such as to prevent expansion of the material or to cause only a partial expansion of the material;
- reheating of the thus-obtained sheet to a temperature such as to cause the post-expansion of the material; and
- thermoforming of the sheet in a thermoforming cavity of shape complementary to that of the desired panel so that the thermoformed panel produced has, at least in the regions having a greater thickness than the basic thickness, an expanded cellular structure where the material has a lower density than the density of the material in the regions having the basic thickness.

It is intended that, taking into account the addition of an expanding agent to the plastics material, which in the extrusion is distributed in a substantially uniform manner within the mass of the material, the panel produced will generally have, even in the regions of minimum thickness, a foamed cellular structure where, however, the material has a greater density than the density of the material in the zones of greater thickness.

The invention also includes a thermoformed panel as defined in the following claims, obtainable with the above-described procedure.

BRIEF DESCRIPTION OF THE DRAWINGS

Further characteristics and advantages of the method and the panel according to the invention will become evident from the following detailed description given with the aid of the attached drawing, in which:

FIG. 1 is a perspective view of a motor vehicle luggage compartment cover panel according to the invention;

FIG. 2 is a section of view taken on the line II—II of FIG. 1;

FIG. 3 is a perspective view of a wheel arch panel for a motor vehicle; and

FIG. 4 is a sectional view of a panel of the type shown in FIG. 3 fitted to the coachwork of a motor vehicle.

DETAILED DESCRIPTION OF THE INVENTION

Panels to which the invention relates are generally formed of a core layer of thermoformable material, which confers on the panel a suitable structural strength, to which surface or cladding layers may possibly be coupled.

Within the scope of the invention polymeric materials such as polyethylene, polypropylene, polyester, or their copolymers are typically utilised for the core layer; in particular, recycled plastics materials can also be utilised which contains polymeric mixtures the majority of which is constituted by polypropylene, polyethylene, polyester, in particular polyethylene terephthalate, together with smaller quantities of other polymers including, in particular, polyethylene-vinyl acetate and SBR rubber. However, it is intended that the choice of material is not binding in relation to the method and the panel according to the invention as long as the material is processable in an extruder and thermoformable.

The cladding layers, whenever present, may for example be constituted by films or sheets of polymeric materials, woven or non-woven fabrics and the like; in this case also, the choice of materials constituting the cladding layers is only constrained by the condition that their application to the core layer should not prejudice the properties of thermoformability of the laminate thus formed.

In FIGS. 1 and 2 there is shown a panel 1 for closure of a motor vehicle luggage space, the structure of which is constituted by a core layer 2 of polymeric material clad on both sides with cladding layers 3 and 4, typically of a non-woven fabric. The panel has, for example, longitudinal and transverse ribs 5 and 6 the function of which is both to increase the rigidity of the panel and to define compartments for receiving various articles on the panel, for resisting the possibility of sliding of such articles on the support surface.

As mentioned the method according to the invention makes it possible to form the ribs or ridges 5 or 6 on one face of the panel without influencing the aesthetic aspect of the other face of the panel, which can be kept substantially flat. Naturally, when the ribs or ridges essentially serve only for improving the rigidity it is intended to be possible to create these on the unseen face of the panel, maintaining the visible face flat whenever this is desirable.

As illustrated in the section of FIG. 2, the core layer 2 of the panel has in general an expanded, non-homogeneous cellular structure where, in the regions of greater thickness, indicated 8 corresponding to the ribs 5 and 6, the material has a greater degree of expansion than the degree of expansion in the regions 9 of lesser thickness and correspondingly a lower density (weight/volume) of material.

In the production method the polymer material—which preferably is a recycled compound—is subjected to extrusion according to conventional techniques, with the addition of a foaming agent, preferably a chemical foaming agent such as sodium or ammonium bicarbonate, citric acid and organic compounds belonging to the azo-and nitrous compounds and hydrazides, particularly azodicarbonamide. The choice of expanding agent, like its concentration, will naturally be determined as a function of the type of plastics material utilised and the desired degree of expansion. For example, for the use of a recycled compound having a melting point of the order of 180–190° C., it is convenient to use azodicarbonamide in concentrations of about 0.5% by weight of the material.

The extrusion process is conducted in such a way as to obtain, at the output from the extruder, either a substantially non-expanded or a partially expanded extruded sheet. To this end the temperature conditions of the extruder can be regulated in such a way that the melt temperature in the extruder does not exceed the decomposition temperature of the expanding agent; alternatively, if the extruder temperatures do exceed the decomposition temperature, the dwell time of the expanding agent at this temperature can be limited in such a way as to avoid decomposition or to cause only partial decomposition. To this end the expanding agent can be introduced into the extruder through a suitable inlet at an intermediate section of the extruder downstream of the feed inlet for the plastics materials.

Within the ambit of the method it is also contemplated that the sheet be extruded with a variable thickness, or rather should have regions of different thickness; such sheets can be obtained according to techniques known per se, with the use of an extruder having an extrusion orifice of variable section.

If the panel it is intended to produce is made of a laminate formed from two or more layers such laminate can be obtained directly by means of a co-extrusion process by techniques known per se.

The sheet of plastics material or of the extruded laminate either directly at the output from the extruder or after cooling and storage is subject to heating in an oven in a temperature suitable to cause the decomposition of the foaming agent and the consequent expansion of the material. The expanded sheet or laminate with an expanded core thus obtained is then subjected to a thermoforming process in a forming cavity of a shape complementary to that of the panel which it is intended to produce.

Whenever post-expansion of the polymeric material has been obtained in an oven the thermoforming causes a greater compression of the material in those regions of the mould of smaller thickness, increasing the density of the material itself, and a lesser compression in the regions of greater thickness where an expanded cellular structure of lower density is achieved.

The method according to the invention also contemplates the case in which the extruded sheet either at the exit from the extruder or after cooling and storage is fed to the thermoforming mould and heated there to the expansion temperature to achieve expansion directly in the mould.

In FIGS. 3 and 4, a wheel arch panel for motor vehicles is indicated 11, which constitutes a particularly advantageous embodiment of the invention. Typically, such panel has a core layer of polymeric material of structural strength, which is clad on one or both sides with layers of cladding typically non-woven fabric, having a sound-deadening and/ or aesthetic function. Panels formed from a single layer of polymeric material are also contemplated within the scope of the invention. The wheel arch panel according to the invention has, on its face which in use is intended to be directed towards the metal sheet, a plurality of reinforcing ribs 12 and 13, at least some of which are of complementary shape to corresponding grooves formed in the metal sheet L of the motor vehicle to which the panel is to be fitted.

As can be seen in the schematic section of FIG. 4 in which, for simplicity, the panel is shown formed by a single layer, this layer has an overall expanded cellular structure with differentiated thicknesses. In the regions of greater thickness, corresponding for example to the ribs 13, which adapts themselves to corresponding grooves of the metal sheet by the foaming agent, the expanded material has expansion pores of greater dimension than the expansion pores present in the regions of lesser thickness and, correspondingly, a lower density. From this results the particularly advantageous fact that the inner surface 14, facing the wheel of the motor vehicle, even in correspondence with the regions where on the opposite surface the ribs 13 are present, can be maintained smooth and free from concavities.

This avoids the creation of cavities which could be seats for accumulation of mud causing—particularly when the panel has a surface layer of non-woven fabric—a deterioration of the material itself. Moreover, the absence of corners on the inner surface in correspondence with the ribs avoids the formation of regions particularly subject to wear.

The expanded cellular structure with differentiated porosity moreover allows in general an improvement in the sound-absorbing characteristics of the panel, whilst at the same time achieving—thanks to the presence of the reinforcing ribs—an adequate structural strength.

What is claimed is:

1. A thermoformed wheel arch panel for a motor vehicle comprising at least one layer of foamed thermoformable plastics material having a plurality of spaced apart reinforcing ribs disposed in different planes and protruding from an outer face of said panel remote from a wheel of a motor vehicle wherein the foamed material in a region corresponding to said reinforcing ribs has a lower density than the density of the material in regions without reinforcing ribs and wherein an inner face of the wheel arch panel, which in use is intended to face toward a wheel of a motor vehicle, is free from concavities in the regions of said reinforcing ribs on said outer face of said panel.

2. A wheel arch panel as set forth in claim 1 further comprising at least one layer of cladding coupled to said outer face of said panel of thermoformable plastics material.

3. A theremoformed wheel arch panel as set forth in claim 2 further comprising a layer of non-woven fabric cladding coupled to the inner surface of the wheel arch panel.

* * * * *